Figure 2:
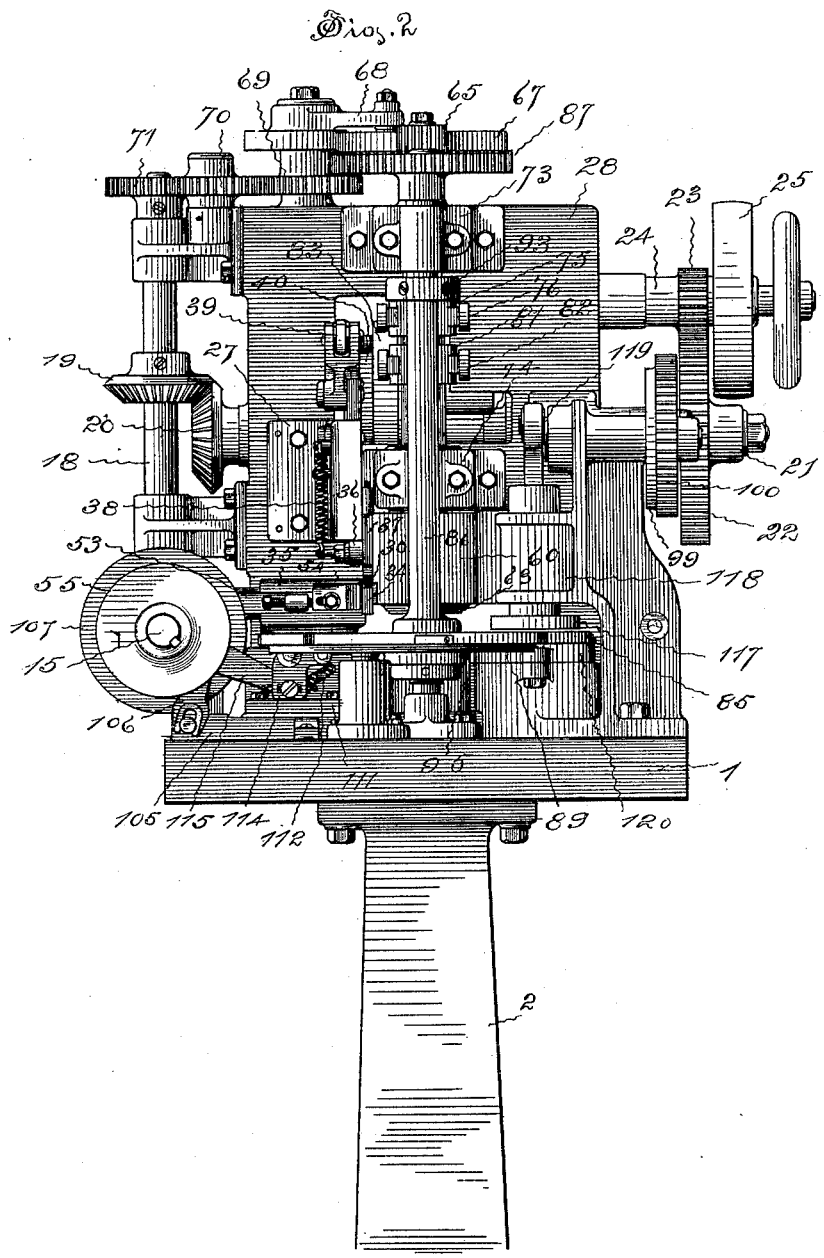

(No Model.)　　　　　　　　　　　　　　　　9 Sheets—Sheet 1.
A. C. CAMPBELL.
CAN WIRING MACHINE.
No. 600,487.　　　　　　　　　Patented Mar. 8, 1898.
Fig. 1
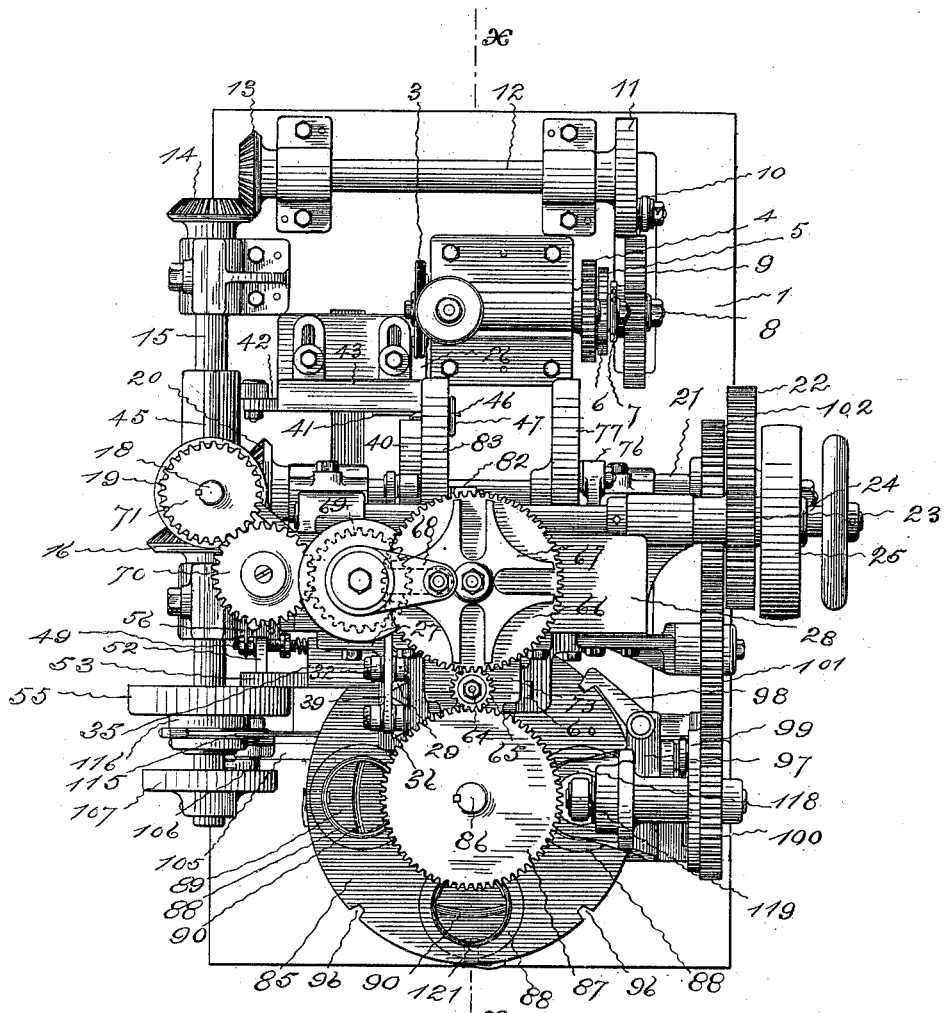
Fig. 30　　　Fig. 31　　　　　　　Fig. 32
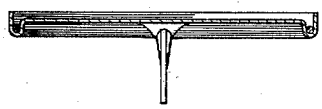
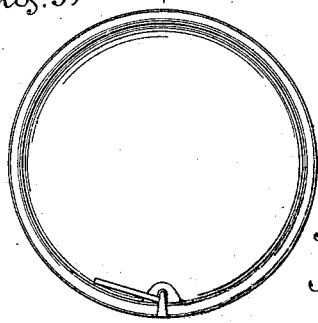
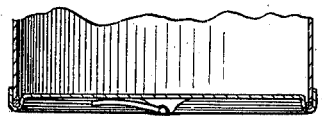
Witnesses:
E. W. Fothergill
E. J. Hyde.
Inventor,
Andrew C. Campbell,
by Harry R. Williams
atty.

(No Model.) 9 Sheets—Sheet 2.

A. C. CAMPBELL.
CAN WIRING MACHINE.

No. 600,487. Patented Mar. 8, 1898.

Witnesses:
E. W. Fothergill.
E. J. Hyde.

Inventor,
Andrew C. Campbell.
by Harry R. Williams
Atty.

(No Model.) 9 Sheets—Sheet 3.

A. C. CAMPBELL.
CAN WIRING MACHINE.

No. 600,487. Patented Mar. 8, 1898.

Witnesses:
E. W. Fothergill
E. J. Hyde

Inventor,
Andrew C. Campbell, by
Harry R. Williams
atty.

(No Model.) 9 Sheets—Sheet 4.

A. C. CAMPBELL.
CAN WIRING MACHINE.

No. 600,487. Patented Mar. 8, 1898.

Witnesses:
E. H. Fothergill
E. J. Hyde

Inventor,
Andrew C. Campbell
by Harry P. Williams
atty.

(No Model.) 9 Sheets—Sheet 5.
A. C. CAMPBELL.
CAN WIRING MACHINE.
No. 600,487. Patented Mar. 8, 1898.
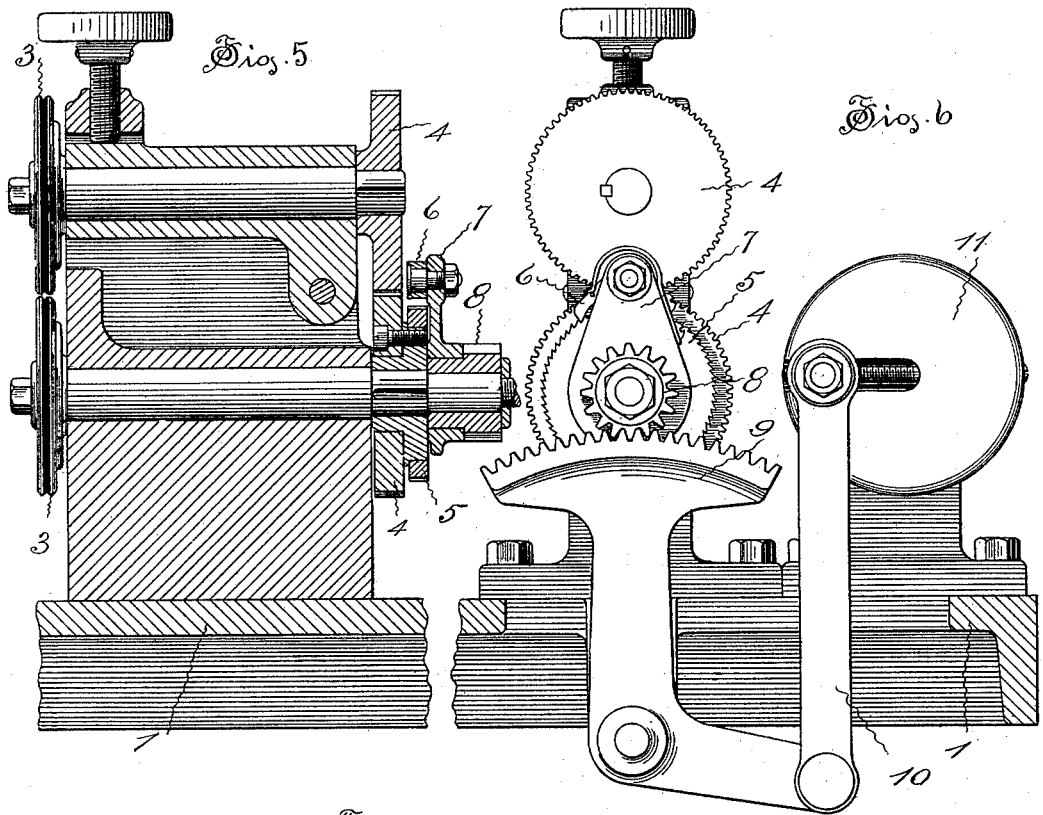
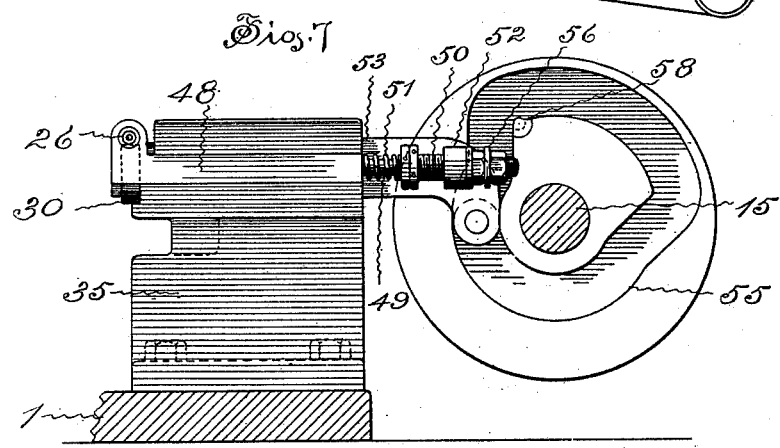
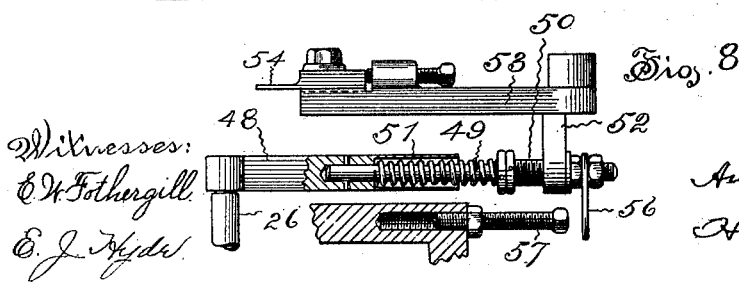
Witnesses:
E. W. Fothergill
E. J. Hyde
Inventor,
Andrew C. Campbell
by Harry R. Williams
atty.
THE NORRIS PETERS CO., PHOTO-LITHO., WASHINGTON, D. C.

(No Model.) 9 Sheets—Sheet 6.
A. C. CAMPBELL.
CAN WIRING MACHINE.
No. 600,487. Patented Mar. 8, 1898.
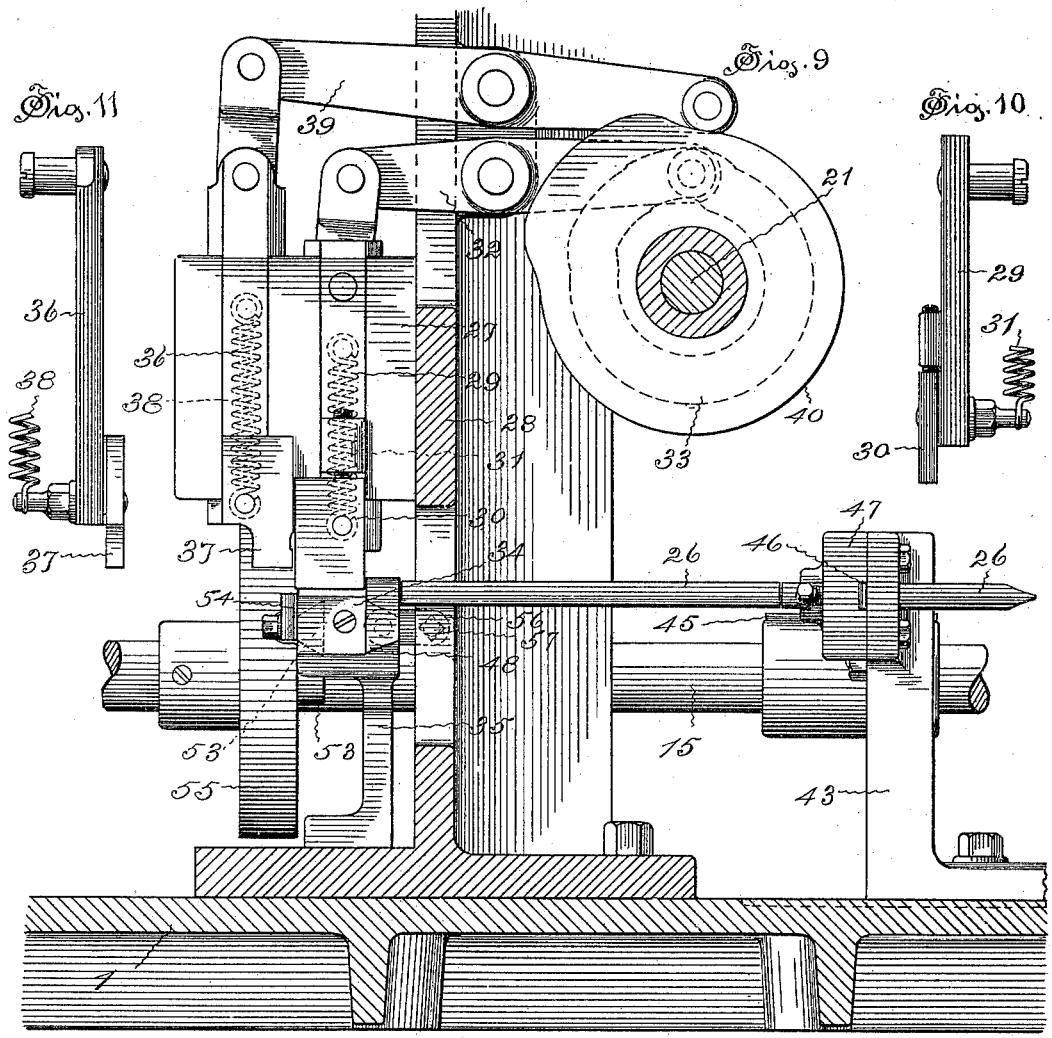
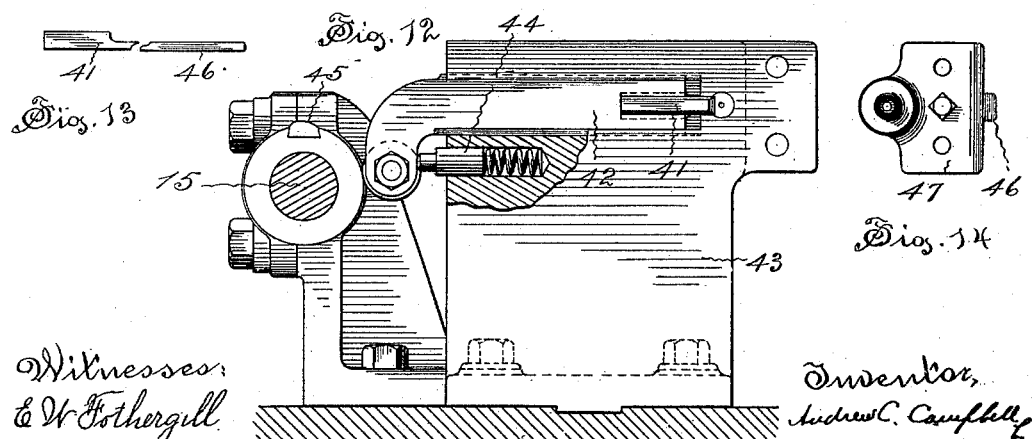
Witnesses:
E. W. Fothergill
E. J. Hyde.
Inventor,
Andrew C. Campbell
Harry R. Williams
atty.

(No Model.) 9 Sheets—Sheet 7.
A. C. CAMPBELL.
CAN WIRING MACHINE.
No. 600,487. Patented Mar. 8, 1898.
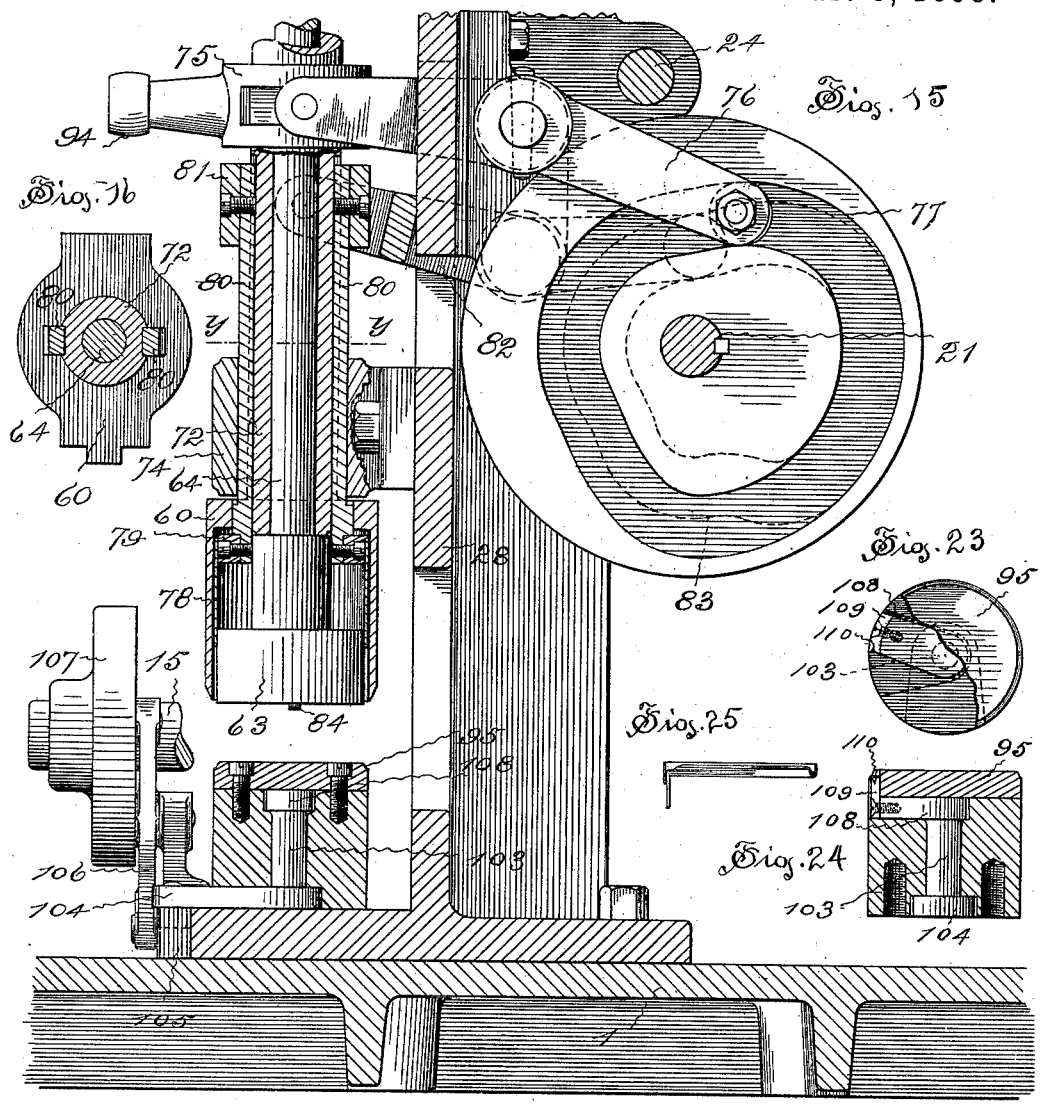
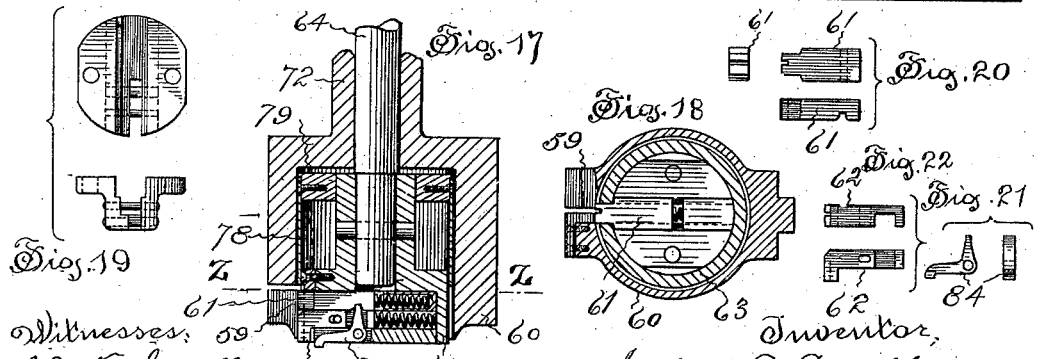

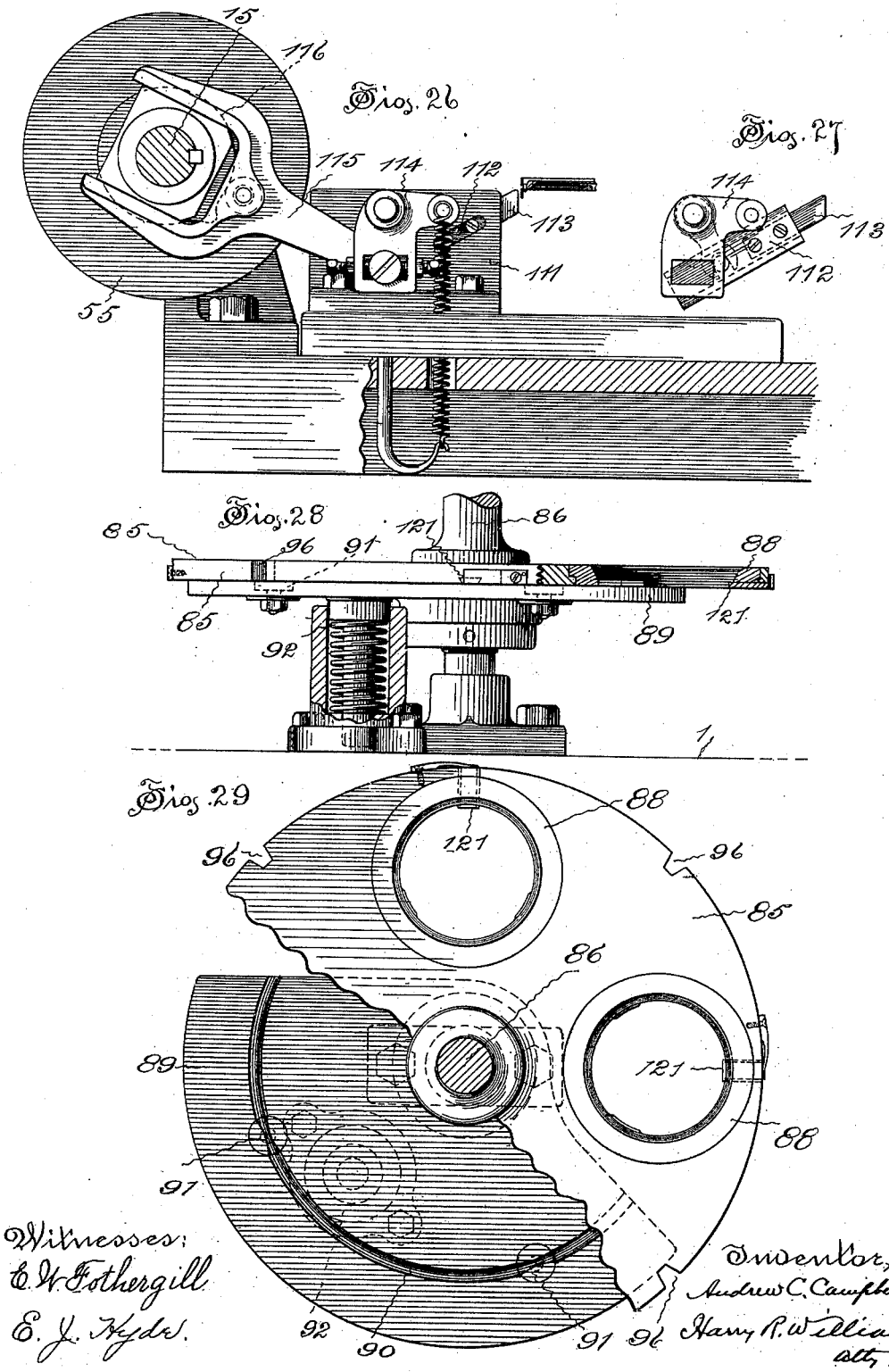

(No Model.) 9 Sheets—Sheet 9.
A. C. CAMPBELL.
CAN WIRING MACHINE.
No. 600,487. Patented Mar. 8, 1898.
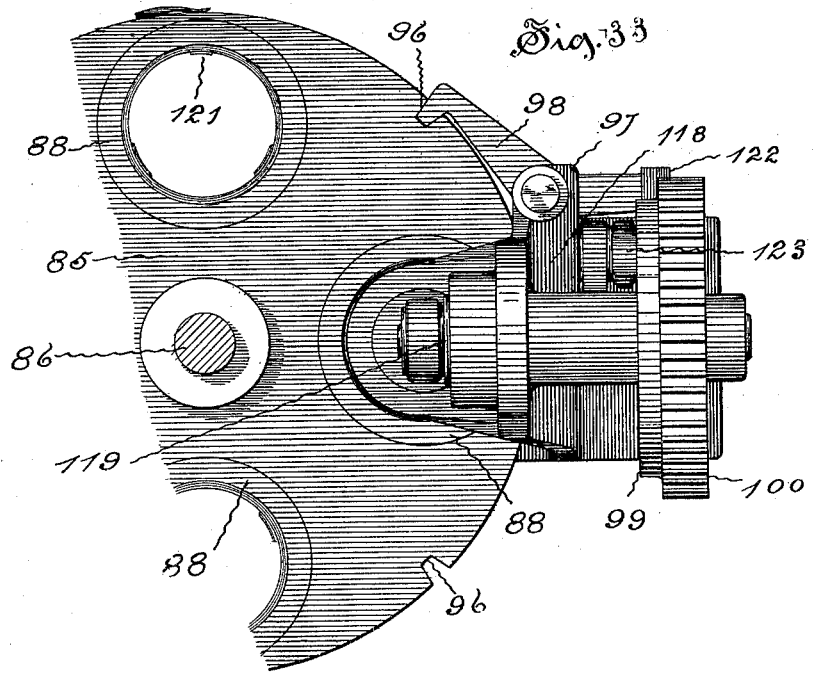
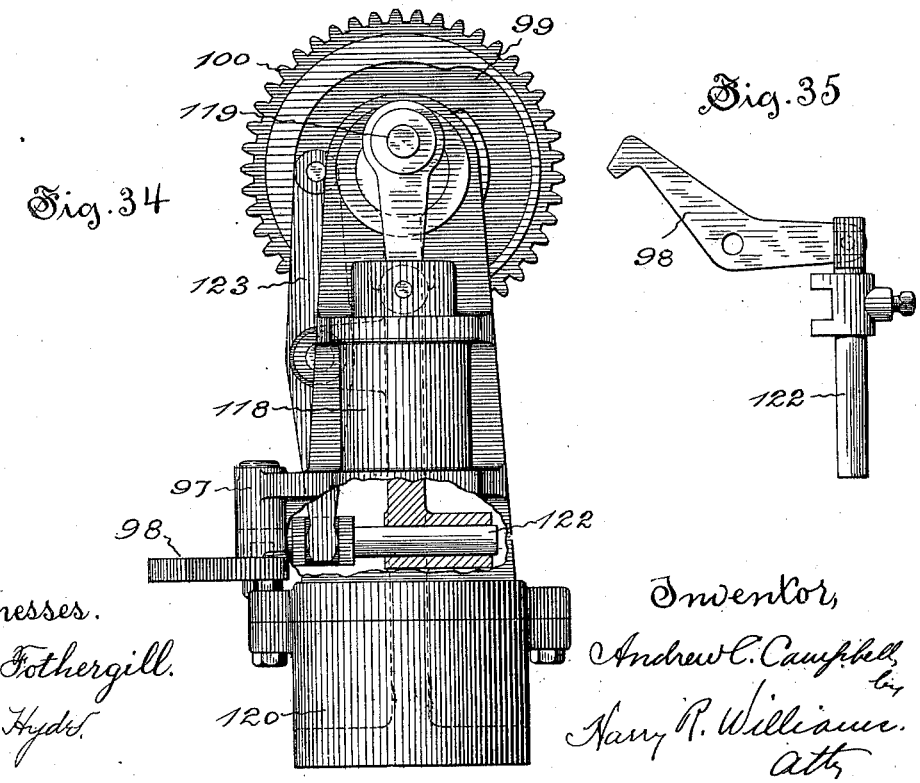
Witnesses.
E. W. Fothergill.
E. J. Hyde.
Inventor,
Andrew C. Campbell,
by Harry R. Williams.
Atty

UNITED STATES PATENT OFFICE.

ANDREW C. CAMPBELL, OF WATERBURY, CONNECTICUT, ASSIGNOR TO THE REMY-JACOBY CAN COMPANY, OF MANSFIELD, OHIO.

CAN-WIRING MACHINE.

SPECIFICATION forming part of Letters Patent No. 600,487, dated March 8, 1898.

Application filed November 10, 1897. Serial No. 658,037. (No model.)

*To all whom it may concern:*

Be it known that I, ANDREW C. CAMPBELL, a citizen of the United States, residing at Waterbury, in the county of New Haven and State of Connecticut, have invented certain new and useful Improvements in Can-Wiring Machines, of which the following is a specification.

This invention relates to a machine for placing the wires in the heads of key-opening cans; and the machine herein shown and described is designed to place in position the wires utilized to rip out the heads and open the cans set forth in the United States Patents to Remy of July 7, 1896, and numbered 563,686, 563,687, and 563,688.

The object of the invention is to provide an automatic machine which will very rapidly locate and secure the ripping-wires in the grooves around the inside of the heads of such cans and which will fold over the lips raised by punching the perforations for the passage of the ripping-key ends of the wires from the inside to the outside of the heads and bend close against the outside of the heads the ends of the wires that pass through the perforations and are to be engaged by the ripping-key, so that these ends while in position to be easily grasped by the ripping-key will not interfere with the packing or stacking of the cans.

In the machine herein set forth as embodying the invention a sufficient length of properly-tinned wire of suitable size is drawn from a coil through straightening-rolls of common construction by feed-rolls actuated by a ratchet-and-pawl mechanism, which is operated by a pinion and segmental gear that is oscillated by a crank action. After a correct amount of wire has been passed into the machine the feed mechanisms dwell, and a slide is moved downwardly by the action of levers and cams and caused to clamp the wire near its forward end. When the wire is securely clamped, another slide is moved downwardly by the action of levers and cams and made to bend the forward end of the wire downwardly at right angles to the line of its feed. A cam-operated cutter severs from this continuous piece of wire an accurate length and also slightly bends sidewise the back end of the cut length. The clamp is released and the wire, with its bent-down end, is by a cam-and-lever-operated slide moved sidewise to the line of its feed until the downturned end is jammed into a groove in a coiling-cylinder. With the bent-down end of the wire in the groove the coiling-cylinder is by means of gears, pinions, and an index mechanism given a single rotation. This drags the wire held by the bent-down end around the cylinder into a complete circle, the front bent-down end of the wire coming around to where the back end is drawn. After the coiling-cylinder has been rotated and coiled a length of wire in this manner it is, together with the coiled wire, with an annular plunger that surrounds the coiling-cylinder and with a holding-cylinder outside of the plunger, by levers and cams made to descend until the outer holding-cylinder rests upon the edge of the turned rim and the inner coiling-cylinder rests upon the flat face of the inside of a head that is brought beneath by the rotation of a head-carrying table. The outer holding-cylinder rests on the edge and the inner coiling-cylinder rests on the face of the inside of a head; but the annular plunger is by its lever and cam made to descend farther, and this forces the coiled wire from the coiling-cylinder downwardly between the walls of the inner coiling-cylinder and the outer holding-cylinder into the circumferential groove around the rim of the head, the bent-down end of the wire passing through the perforation made for the purpose near the edge of the head. The bent-down end of the wire is guided through this perforation by grooves in spring-slides that are located in the body of the inner coiling-cylinder and are withdrawn by contact of the parts at the proper time to permit the passage of the wire.

The cam-heads are placed in openings in a table that is intermittently rotated by pinions, gears, and an index mechanism to bring the heads at the proper time over an anvil with the circumferential grooves for the coiled wires beneath the annular plunger and the perforations in line with the bent-down ends of the wires. After the wire has been jammed into the groove of the head a swinging finger mounted on the anvil beneath is oscillated by a rock-shaft, so as to bend the downwardly-projecting end of the wire against the outside face of the head. Then a slide is thrust forward in such manner as to bend down the lip raised by the perforation of the head and also to jam the end of the wire, so it will lie very close to the face of the head. The head provided with the ripping-wire is, after the cylinders and plunger have been withdrawn, carried by the rotating table in line with a punch, which by a crank mechanism is made to descend and force the head from the table through a die, which regages the head as it drops from the machine and insures that it will fit the cam-body for which it was made. The heads are fed to the revolving table from the front and carried in succession beneath the cylinders and plungers, and the wire is fed to the coiling-cylinder and cut off at the proper intervals, so that the operation of the machine is continuous.

Figure 3:
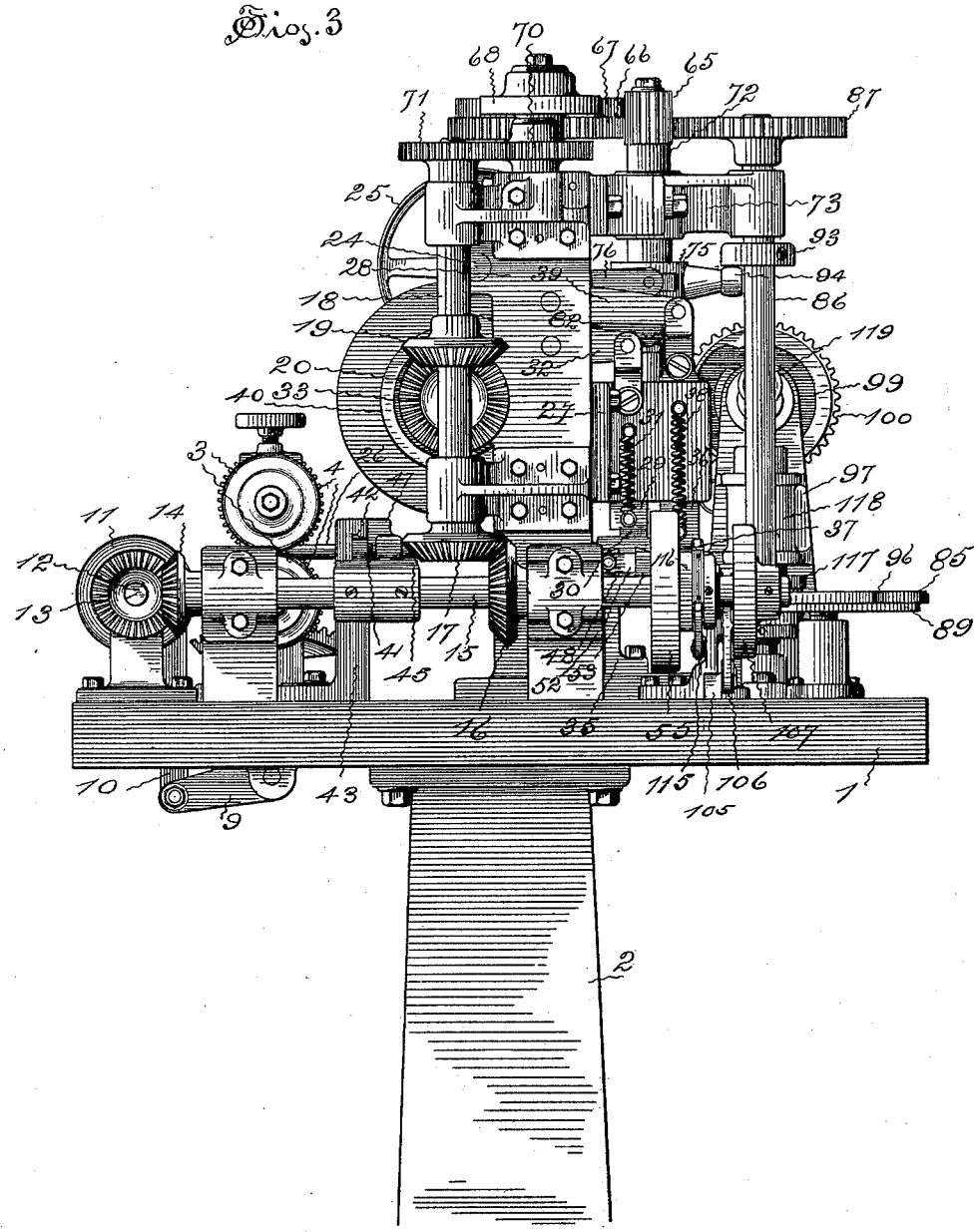
Figure 4:
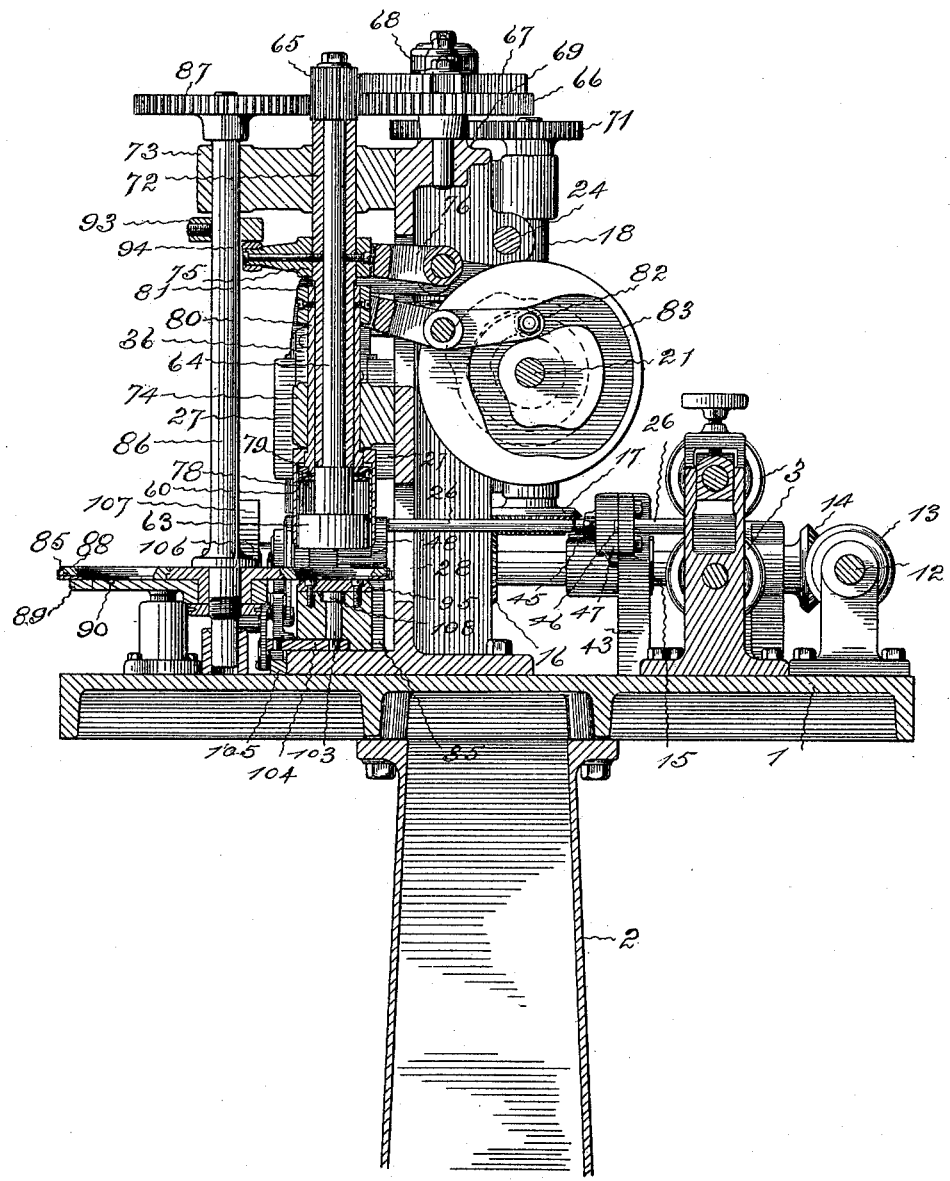

Figure 1 of the accompanying drawings is a plan of a can-wiring machine which embodies the invention. Fig. 2 is a front elevation of the same. Fig. 3 is a side elevation. Fig. 4 is a vertical section on the plane indicated by the broken line X X of Fig. 1. Fig. 5 is a detail view, on larger scale, showing the feed-rolls and their connections. Fig. 6 is a view of the feed-roll-operating mechanisms. Fig. 7 is a side view of the slide and mechanism that operates the slide for pushing the wire, with its bent-down end, sidewise to the coiling-cylinder. Fig. 8 is a plan view of this slide and its connections, parts being broken in section. Fig. 9 is a side elevation of a portion of the machine, showing the clamping-slide and the bending-down slide, together with their operating mechanisms. Fig. 10 shows a detail view of the clamping-slide. Fig. 11 shows a detail view of the bending-down slide. Fig. 12 is a side view of the cutter and its operating mechanism. Fig. 13 shows detached views of the cutter and the plate with which it coöperates when the wire is severed. Fig. 14 is a detail view of the block that holds the wire at the cutter. Fig. 15 is a side elevation, with parts in section, of the inner coiling-cylinder, the annular plunger, and the outer holding-cylinder, together with their operating mechanisms. Fig. 16 is a transverse sectional view of the plunger and cylinder connections, taken on the plane indicated by the broken line Y Y of Fig. 15. Fig. 17 is a detail sectional view of the inner coiling-cylinder, the annular plunger, and the outer holding-cylinder, taken on a different plane from that shown in Fig. 15. Fig. 18 is a transverse section of the inner and outer cylinders, taken on the plane Z Z of Fig. 17. Fig. 19 shows detail views of the slide-holding block which is placed in the end of the inner coiling-cylinder. Fig. 20 shows views of the upper slotted guiding-slide. Fig. 21 shows views of the lever that withdraws the upper guiding-slide. Fig. 22 shows views of the lower guiding-slide. Fig. 23 is a plan of the anvil that is supported by the bed beneath the cylinders and plunger, with a part broken away to show the swinging finger that turns up against the outside face of the head the bent-down end of the wire. Fig. 24 is a sectional view of the anvil and swinging finger. Fig. 25 is a sectional view of the cover, showing the position of the bent-down end of the wire before this swinging finger bends it up. Fig. 26 is a side elevation of the slide and the operating mechanism that causes the slide to bend over the lip which is formed by cutting the perforation through the edge of the head for the passage of the wire. Fig. 27 is a detail view of this slide and its connections. Fig. 28 is a side elevation of the head-carrying table, parts being broken in section to show the construction. Fig. 29 is a plan of the head-carrying table with parts broken away. Fig. 30 is a sectional view of a head wired by this machine before the end of the wire and the lip are bent against the face of the head. Fig. 31 is a view of the outside face of a head wired by this machine. Fig. 32 is a sectional view of the end of a can provided with a head wired by this machine. Fig. 33 is a detail plan view illustrating the table-locking mechanism. Fig. 34 is a side elevation illustrating this mechanism, and Fig. 35 is a view of the locking-lever and the rod that is connected thereto.

The bed 1 of the machine may be supported upon any form of column 2. On the bed near the back is a block provided with bearings for the shafts of the feed-rolls 3. The bearing for the lower shaft is shown as stationary, and the bearing for the upper shaft is movable, so that the upper roll may be adjusted with relation to the lower for wire of different diameters. These shafts bear intermeshing gears 4, and to the lower is attached a ratchet-wheel 5. Engaging with the teeth of this ratchet is a pawl 6, borne by an arm 7, that is connected with the hub of a pinion 8. Meshing with this pinion is a segmental gear 9, that is connected with a link 10, which is adjustably attached to a crank-disk 11, Figs. 5 and 6. The disk 11 is mounted on a shaft 12, which bears a bevel-gear 13, that meshes with a bevel-gear 14 on a shaft 15. The shaft 15 bears a bevel-gear 16, that meshes with a bevel-gear 17 on a vertical shaft 18, which bears a bevel-gear 19, meshing with a bevel-gear 20 on the horizontal shaft 21. This latter shaft bears a spur-gear 22, in mesh with which is a pinion 23, borne by a shaft 24, provided with a driving-pulley 25, Figs. 1, 2, and 3. By means of these gears and shafts the crank-disk is rotated and the segment oscillated, so as to, through the pawl and ratchet, intermittently rotate the feed-rolls. The wire that is thus intermittently fed into the machine by these rolls is preferably passed through a guiding-tube 26, Figs. 3, 4, and 9.

When a sufficient amount of wire has been fed into the machine, the feed mechanisms dwell and a slide is moved so as to clamp the wire near its forward end. Loosely held in a guideway formed in the bracket 27, that is attached to the vertical frame 28, mounted on the bed, is a slide 29, and secured by adjustable means to the lower end of this slide is a clamping-plate 30. This slide is held in a raised position by a spring 31 and is adapted to be forced downwardly by the lever 32, which at the proper time is oscillated by a cam 33 on the shaft 21. The downward movement of the slide clamps the wire between the end of the clamp-plate 30, which it bears, and a stationary plate 34, secured to a bracket 35, mounted upon the base of the vertical frame, Figs. 1, 2, 3, 9, and 10. Loosely held in another guideway in the same bracket is a slide 36, to the lower end of which is secured a bending-plate 37. This slide is held raised by a spring 38 and is adapted to be forced downwardly by a lever 39, that is oscillated by a cam 40 on the shaft 21. When the wire is securely clamped, the cam oscillates the lever, so that the plate 37 is forced against the end of the wire that projects beyond the clamp and bends that end downwardly at right angles to its line of feed, Figs. 1, 2, 3, 9, and 11. After the forward end of the wire has been bent down a correct length is severed from the continuous piece by a cutter-blade 41, which is secured to a slide 42, held in a guideway in the bracket 43, that is adjustably mounted upon the bed. This slide is held back by a spring-pin 44 and is forced forward at the proper time for cutting by the action of the cam 45, borne by the shaft 15. The bracket 43 is held to the bed by bolts which pass through slots, so that it may be adjusted to different positions for cutting wires of various lengths for the heads of cans of greater or less capacity, and this cam is made quite wide on the shaft in order to properly engage the cutter-slide wherever it is adjusted, Figs. 1, 3, 4, 9, and 12.

The cutter-blade 41 is shaped to sever a piece of wire and also, in connection with a backing plate 46, to slightly bend sidewise the rear end of the cut-off piece, so that when the wire is located in the groove in a can-head this bent end will lie in the swelled depression that is made when the wire perforation is punched through the can-head, as described in the patents for the can-heads above mentioned, and become so embedded in the solder used to seal the perforation made through the head at the swelled portion that the wire cannot be pulled from the groove when the head is being ripped open. This backing plate is adjustably mounted in a block 47, secured to the bracket 43. The guiding-tube 26 is formed in sections to permit the adjustment of the cutter-bracket, and the front end of the rear section is held by the walls of the bracket 43. The back end of the front section is held by the block 47, and the front end of the front section is supported by a part of the sidewise-pushing slide 48, Figs. 4, 7, 8, 9, 12, 13, and 14.

The slide 48 pushes the wire sidewise into the groove of the coiling-cylinder. This slide is mounted in a groove in one face of the bracket 35. Connected with this slide is a rod 49, loosely placed upon which are an exteriorly-threaded sleeve 50 and a spiral spring 51, that thrusts between the slide and adjusting-nuts on the sleeve. Adjustably connected with the sleeve is an arm 52, that projects from a slide 53, which moves in a groove in the opposite face of the bracket 35. Adjustably connected with the end of the slide 53 is a jamming-plate 54. The slide 53 is provided with a roll that is adapted to engage with a cam 55 on the shaft 15. Projecting from the rod 49 is a finger 56, that is arranged to make engagement with a stop-screw 57, which turns in a threaded socket in the wall of the frame and is provided with a clamping-nut, Figs. 7, 8, and 9.

The clamp-plate 30 holds the wire between the end of the slide 48 and the jamming-plate 54, and when this clamp is released the cam 55 moves the slide 53 forward, and this carries forward the slide 48, that bears the end of the wire-guiding tube 26. When the wire is carried over to the coiling-cylinder, the finger 56 engages the stop-screw 57 and prevents further movement of the slide 48. The cam 55, however, at this time has not reached its highest point, but continues to advance the slide 53 with the plate 54, and as the highest point of the cam is reached quickly the plate 54 is caused to jam the bent-down end of the wire which is in front of it into the groove of the coiling-cylinder. This causes the bent-down end of the wire to be given a slight bend sidewise, so that it will surely remain in the groove. The slides then move backward together. The cam 55 is preferably provided with a hardened piece 58 at its highest point for jamming the bent end of the wire into the groove of the coiling-cylinder, Figs. 2, 3, 7, 8, and 9.

A mortise 59 is made in one side of the outer holding-cylinder 60, and the bent-down end of the wire is pushed through this mortise and jammed into grooves in the edges of the slides 61 and 62, which are held by and rotated with the inner coiling-cylinder 63, Figs. 17 and 18.

The coiling-cylinder is mounted on a shaft 64, that at the upper end bears a wide pinion 65, in mesh with which is a gear 66, and upon the face of this gear is an index-dial 67. An arm 68, that bears a roll which is adapted to engage the mortises of the index-dial, is mounted upon the shaft of a gear 69, in mesh with which is a gear 70, that meshes with a gear 71 on the vertical shaft 18, Figs. 1, 2, 3, and 4. The index-dial is shown as having four mortises, and at each revolution of the gears the index mechanism rotates the gear 66 one-quarter of a revolution; but as the gear 66 and the pinion 65 are as four to one the coiling-cylinder is given a complete revolution at each movement of the index-dial.

When the coiling-cylinder is rotated by this mechanism, the bent-down end of the wire is drawn by the notches in the slides of the coiling-cylinder into the space between the inner coiling-cylinder and the outer holding-cylinder, and this drags the rest of the wire through the mortise 59 and coils it into a complete circle between the inner and outer cylinders.

The coiling-cylinder shaft 64 is supported by the hollow shank 72 of the holding-cylinder, so that it may be rotated therein, and the shank of the holding-cylinder is held by brackets 73 and 74, attached to the vertical frame 28, so that it may be reciprocated with but not rotated with the shaft 64. Mounted on the shank of the holding-cylinder is a collar 75, and connected with this collar is a lever 76, which bears a roll that is engaged by the cam 77 on the shaft 21, Figs. 4 and 15.

Located between the holding-cylinder and the coiling-cylinder is an annular plunger 78. The upper end of this plunger is secured to a collar 79, that is connected by rods 80 with a collar 81. Connected to the collar 81 is a lever 82, that bears a roll which is engaged by a cam 83 on the shaft 21, Figs. 4, 15, 16, 17, and 18.

After the wire has been coiled into a circle the cams and levers move the annular plunger and the inner and outer cylinders, with the coiled wire between, downwardly together until the edge of the holding-cylinder rests upon the edge and the end of the coiling-cylinder rests upon the face of the head of the can that has been located beneath. These cylinders stop in these positions, but the plunger is moved still farther downward, so as to force the coiled wire which is between the cylinders into the groove around the rim of the can-head. As this is accomplished the bent-down end of the wire passes through the perforation made for the purpose in the edge of the can-head.

When the end of the coiling-cylinder approaches the face of the can-head, the angle-lever 84 is oscillated and caused to draw into the body of the cylinder the spring-slide 61, so that this slide will not obstruct the downward movement of the wire. When the wire and the edge of the plunger reach the chamfered edge of the slide 62, that slide is pushed back. By means of these slides the bent-down end of the wire is guided in its downward movement, so that it will surely pass into the perforation provided for it through the edge of the can-head, Figs. 17, 18, 19, 20, 21, and 22.

The can-heads are located in recesses in a table 85, mounted on a shaft 86, that at the upper end bears a gear 87, which meshes with a pinion 65. By means of these connections the table is given a quarter-revolution at each movement of the index-dial and each rotation of the coiling-cylinder, Figs. 1, 2, 3, and 4.

The recesses in the table are provided with bushings 88, that can be removed in order that others of a different size may be supplied to provide for holding can-heads of various diameters, and projecting into the recesses are spring-fingers 121, which retain the heads in position. Beneath a portion of the rotary table is a non-rotary bed-plate 89, provided with a groove 90, which at certain points is reduced in width. This groove is preferably reduced in width by the insertion of plugs 91, which have narrow grooves that register with the main groove. The bed-plate is loosely supported upon the table-shaft and is forced upwardly by a spring 92, Figs. 4, 28, and 29.

The can-heads are placed in the recesses in the table with the rims up and the lips that are punched out when the perforations are made for the bent-down ends of the wire projecting downwardly into the groove in the bed-plate. As the table rotates with the can-heads the lips follow the groove, and the heads are by these means registered, so that as they stop beneath the cylinders and annular plunger the perforations will be directly beneath the bent-down ends of the wires.

The shaft 86 is so supported by bearings at its upper and lower ends that it may have a vertical movement, and it is held raised by the engagement with the collar 93, which it bears, of a roll 94, mounted on a stud that projects from the collar 75. When the table dwells with a can-head beneath the cylinders and annular plunger, the moving downwardly of the lever that depresses these parts causes the roll 94 to move away from the collar 93 and allow the shaft 86 to drop down, so that the can-head beneath the cylinders and plunger will rest upon the upper face of the anvil 95. When the cylinders and plunger are lifted, the roll again engages the collar and lifts the table, so that the can-head, with the wire in place, is raised from the anvil and the table is free to be rotated, Figs. 4 and 15.

In the edge of the table are a series of notches 96, and pivoted to a bracket 97 is a lever 98, that has one end arranged to engage the different notches. This lever is oscillated by the rotation of the cam 99, that is formed on the face of the gear 100 in mesh with the gear 101, that meshes with a gear 102 on the shaft 21. The lever 98 is connected with a rod 122, that slides in bearings formed in the frame 118, and engaging with this rod is the lower end of a lever 123, the upper end of which bears a roll that runs in the cam-groove
99. At the proper time this lever is oscillated, so that its locking end is withdrawn from a locking-notch, leaving the table free to be rotated. After the table has been rotated the locking end of the lever enters another notch and locks the table in the correct position for the proper placing of a wire in the can-head over the anvil below, Figs. 1, 33, 34, and 35.

The anvil 95 is secured to the base of the frame 28 directly beneath the cylinders and annular plunger. In the center of the anvil is a shaft 103, that at its lower end is attached to a rocker-arm 104. Connected with the arm 104 is a slide 105, that is reciprocated by the oscillation of the lever 106, which bears a roll that is engaged by a cam 107. Connected with the upper end of the shaft 103 is a finger 108, which is preferably provided with a hardened face 109, that has a notch 110 on one edge. When a can-head with a coiled wire forced into its groove and the bent-down end projecting through the perforation, as shown in Fig. 25, is resting upon the anvil, this finger is by these mechanisms given an oscillation, so as to bend over the end of the wire and cause it to lie against the face of the head, Figs. 2, 3, 4, 15, 23, and 24.

Mounted in a way formed in the bracket 111 is an inclined slide 112, that bears a jabbing-plate 113. This slide is connected with a lever 114, that is adjustably connected with a bar 115, which is given a reciprocation by the cam 116 on the shaft 15, Figs. 26 and 27. After the oscillating finger in the anvil has bent the end of the wire against the face of the head the plate 113 is by these mechanisms caused to suddenly bend the lip up around the wire against the face of the head, and this also jabs the wire in such manner that it will be sure to lie close against the face of the head near the rim. This leaves the end of the wire and the lip as illustrated in Figs. 31 and 32.

After these operations have been performed and the lock is released the table is rotated until the head thus operated upon is carried beneath a punch. The punch-head 117 is held in a frame 118 and is adapted to be reciprocated by a crank 119 on the shaft of the gear 100. After the wired can-head is brought beneath the punch moves downwardly and forces the head through the opening in the table in which it is held and through a die 120, which is located below. The heads on being discharged from the machine are punched through this die to insure that when they are delivered from the machine they will be exactly gaged to fit the cans for which they are intended, Figs. 1 and 2.

The cams are so timed that the various operations performed by this machine take place successively at the correct moment, and the mechanisms are so adjustable that the parts will operate accurately, and the stock will be presented for the operations in an exact manner. This allows the machine to be run rapidly and insures a large output of good quality.

I claim as my invention—

1. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, mechanisms for reciprocating the punch, and a die in line with the punch, substantially as specified.

2. In a can-wiring machine, in combination, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, mechanisms for reciprocating the punch, and a die in line with the punch, substantially as specified.

3. In a can-wiring machine, in combination, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, mechanisms for reciprocating the punch, and a die in line with the punch, substantially as specified.

4. In a can-wiring machine, in combination, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, mechanisms for reciprocating the punch, and a die in line with the punch, substantially as specified.

5. In a can-wiring machine, in combination, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, mechanisms for reciprocating the punch, and a die in line with the punch, substantially as specified.

6. In a can-wiring machine, in combination, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, mechanisms for reciprocating the punch, and a die in line with the punch, substantially as specified.

7. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, and mechanisms for reciprocating the punch, substantially as specified.

8. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, and mechanisms for forcing the jabber, substantially as specified.

9. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, an anvil in line with the plunger, a folder, and mechanisms for moving the folder, substantially as specified.

10. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, mechanisms for advancing the table, and an anvil in line with the plunger, substantially as specified.

11. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a table, and mechanisms for advancing the table, substantially as specified.

12. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, and mechanisms for reciprocating the plunger, substantially as specified.

13. In a can-wiring machine, in combination, a clamp, mechanisms for closing and releasing the clamp, a bender, mechanisms for moving the bender, a cutter, mechanisms for actuating the cutter, a pusher, mechanisms for operating the pusher, a coiling device, mechanisms for rotating the coiling device, a plunger, and mechanisms for reciprocating the plunger, substantially as specified.

14. In a can-wiring machine, in combination, a bender, mechanisms for moving the bender, a cutter, mechanisms for actuating the cutter, a pusher, mechanisms for operating the pusher, a coiling device, mechanisms for rotating the coiling device, a plunger, and mechanisms for reciprocating the plunger, substantially as specified.

15. In a can-wiring machine, in combination, a cutter, mechanisms for actuating the cutter, a pusher, mechanisms for operating the pusher, a coiling device, mechanisms for rotating the coiling device, a plunger, and mechanisms for reciprocating the plunger, substantially as specified.

16. In a can-wiring machine, in combination, a pusher, mechanisms for operating the pusher, a coiling device, mechanisms for rotating the coiling device, a plunger, and mechanisms for reciprocating the plunger, substantially as specified.

17. In a can-wiring machine, in combination, a reciprocating and rotating coiling device, mechanisms for reciprocating and rotating the coiling device, a plunger, and mechanisms for reciprocating the plunger, substantially as specified.

18. In a can-wiring machine, in combination, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, mechanisms for forcing the jabber, a punch, and mechanisms for reciprocating the punch, substantially as specified.

19. In a can-wiring machine, in combination, a coiling device, mechanisms for rotating the coiling device, a plunger, mechanisms for reciprocating the plunger, a table, mechanisms for advancing the table, an anvil in line with the plunger, a folder, mechanisms for moving the folder, a jabber, and mechanisms for forcing the jabber, substantially as specified.

20. In a can-wiring machine, in combination, a coiling device, mechanisms for rotating the coiling device, a plunger, mechanisms for reciprocating the plunger, a table, mechanisms for advancing the table, an anvil in line with the plunger, a folder, and mechanisms for moving the folder, substantially as specified.

21. In a can-wiring machine, in combination, a coiling device, mechanisms for rotating the coiling device, a plunger, mechanisms for reciprocating the plunger, a table, mechanisms for advancing the table, and an anvil in line with the plunger, substantially as specified.

22. In a can-wiring machine, in combination, a coiling device, mechanisms for rotating the coiling device, a plunger, mechanisms for reciprocating the plunger, a table, and mechanisms for advancing the table, substantially as specified.

23. In a can-wiring machine, in combination, a feed device, mechanisms for driving the feed device, a bender, mechanisms for moving the bender, a coiling device, mechanisms for rotating the coiling device, a plunger, and mechanisms for reciprocating the plunger, substantially as specified.

24. In a can-wiring machine, in combination, a feed device, mechanisms for driving the feed device, a cutter, mechanisms for actuating the cutter, a coiling device, mechanisms for rotating the coiling device, a plunger, and mechanisms for reciprocating the plunger, substantially as specified.

25. In a can-wiring machine, in combination, a feed device, mechanisms for driving the feed device, a clamp, mechanisms for closing and releasing the clamp, a bender, mechanisms for moving the bender, a coiling device, mechanisms for rotating the coiling device, a plunger, and mechanisms for reciprocating the plunger, substantially as specified.

26. In a can-wiring machine, in combination, a feed device, mechanisms for driving the feed device, a clamp, mechanisms for closing and releasing the clamp, a cutter, mechanisms for actuating the cutter, a coiling device, mechanisms for rotating the coiling device, a plunger, and mechanisms for reciprocating the plunger, substantially as specified.

27. In a can-wiring machine, in combination, a feed device, mechanisms for driving the feed device, a bender, mechanisms for moving the bender, a cutter, mechanisms for actuating the cutter, a coiling device, mechanisms for rotating the coiling device, a plunger, and mechanisms for reciprocating the plunger, substantially as specified.

28. In a can-wiring machine, in combination, a feed device, mechanisms for driving the feed device, a bender, mechanisms for moving the bender, a pusher, mechanisms for operating the pusher, a coiling device, mechanisms for rotating the coiling device, a plunger, and mechanisms for reciprocating the plunger, substantially as specified.

29. In a can-wiring machine, in combination, a bender, mechanisms for moving the bender, a coiling device, mechanisms for rotating the coiling device, a plunger, and mechanisms for reciprocating the plunger, substantially as specified.

30. In a can-wiring machine, in combination, a cutter, mechanisms for actuating the cutter, a reciprocating and rotating coiling device, mechanisms for reciprocating and rotating the coiling device, a plunger, and mechanisms for reciprocating the plunger, substantially as specified.

31. In a can-wiring machine, in combination, a clamp, mechanisms for closing and releasing the clamp, a bender, mechanisms for moving the bender, a coiling device, mechanisms for rotating the coiling device, a plunger, and mechanisms for reciprocating the plunger, substantially as specified.

32. In a can-wiring machine, in combination, a clamp, mechanisms for closing and releasing the clamp, a cutter, mechanisms for actuating the cutter, a coiling device, mechanisms for rotating the coiling device, a plunger, and mechanisms for reciprocating the plunger, substantially as specified.

33. In a can-wiring machine, in combination, a bender, mechanisms for moving the bender, a cutter, mechanisms for actuating the cutter, a coiling device, mechanisms for rotating the coiling device, a plunger, and mechanisms for reciprocating the plunger, substantially as specified.

34. In a can-wiring machine, in combination, a feed device, mechanisms for driving the feed device, a clamp, mechanisms for closing and releasing the clamp, a bender, mechanisms for moving the bender, a cutter, mechanisms for actuating the cutter, a coiling device, mechanisms for rotating the coiling device, a plunger, and mechanisms for reciprocating the plunger, substantially as specified.

35. In a can-wiring machine, in combination, a clamp, mechanisms for closing and releasing the clamp, a bender, mechanisms for moving the bender, a cutter, mechanisms for actuating the cutter, a coiling device, mechanisms for rotating the coiling device, a plunger, and mechanisms for reciprocating the plunger, substantially as specified.

36. In a can-wiring machine, in combination, a clamp, mechanisms for closing and releasing the clamp, a bender, mechanisms for moving the bender, a pusher, mechanisms for operating the pusher, a coiling device, mechanisms for rotating the coiling device, a plunger, and mechanisms for reciprocating the plunger, substantially as specified.

37. In a can-wiring machine, in combination, a clamp, mechanisms for closing and releasing the clamp, a cutter, mechanisms for actuating the cutter, a pusher, mechanisms for operating the pusher, a coiling device, mechanisms for rotating the coiling device, a plunger, and mechanisms for reciprocating the plunger, substantially as specified.

38. In a can-wiring machine, in combination, a coiling device, mechanisms for rotating the coiling device, a plunger, mechanisms for reciprocating the plunger, an anvil in line with the plunger, a folder, mechanisms for moving the folder, a jabber, mechanisms for forcing the jabber, a punch, and mechanisms for reciprocating the punch, substantially as specified.

39. In a can-wiring machine, in combination, a coiling device, mechanisms for rotating the coiling device, a plunger, mechanisms for reciprocating the plunger, an anvil in line with the plunger, a folder, mechanisms for moving the folder, a jabber, and mechanisms for forcing the jabber, substantially as specified.

40. In a can-wiring machine, in combination, a coiling device, mechanisms for rotating the coiling device, a plunger, mechanisms for reciprocating the plunger, an anvil in line with the plunger, a folder, and mechanisms for moving the folder, substantially as specified.

41. In a can-wiring machine, in combination, a coiling device, mechanisms for rotating the coiling device, a plunger, mechanisms for reciprocating the plunger, and an anvil in line with the plunger, substantially as specified.

42. In a can-wiring machine, in combination, a coiling device, mechanisms for rotating the coiling device, a plunger, mechanisms for reciprocating the plunger, a punch, and mechanisms for reciprocating the punch, substantially as specified.

43. In a can-wiring machine, in combination, a coiling device, mechanisms for rotating the coiling device, a plunger, mechanisms for reciprocating the plunger, a jabber, and mechanisms for forcing the jabber, substantially as specified.

44. In a can-wiring machine, in combination, a coiling device, mechanisms for rotating the coiling device, a plunger, mechanisms for reciprocating the plunger, a folder, and mechanisms for moving the folder, substantially as specified.

45. In a can-wiring machine, in combination, a coiling device, mechanisms for rotating the coiling device, a plunger, mechanisms for reciprocating the plunger, a folder, mechanisms for moving the folder, a jabber, and mechanisms for forcing the jabber, substantially as specified.

46. In a can-wiring machine, in combination, a coiling device, mechanisms for rotating the coiling device, a plunger, mechanisms for reciprocating the plunger, a table, mechanisms for advancing the table, a punch, and mechanisms for reciprocating the punch, substantially as specified.

47. In a can-wiring machine, in combination, a coiling device, mechanisms for rotating the coiling device, a plunger, mechanisms for reciprocating the plunger, a folder, mechanisms for moving the folder, a jabber, mechanisms for forcing the jabber, a punch, and mechanisms for reciprocating the punch, substantially as specified.

48. In a can-wiring machine, in combination, a coiling device, mechanisms for rotating the coiling device, a plunger, mechanisms for reciprocating the plunger, a punch, mechanisms for reciprocating the punch, and a die in line with the punch, substantially as specified.

49. In a can-wiring machine, in combination, a feed device, mechanisms for driving the feed device, a bender, mechanisms for moving the bender, a pusher, mechanisms for operating the pusher, a coiling device, mechanisms for rotating the coiling device, a plunger, mechanisms for reciprocating the plunger, a folder, and mechanisms for moving the folder, substantially as specified.

50. In a can-wiring machine, in combination, a feed device, mechanisms for driving the feed device, a bender, mechanisms for moving the bender, a cutter, mechanisms for actuating the cutter, a pusher, mechanisms for operating the pusher, a coiling device, mechanisms for rotating the coiling device, a plunger, mechanisms for reciprocating the plunger, a folder, and mechanisms for moving the folder, substantially as specified.

51. In combination with the mechanisms of a can-wiring machine, a coiling-cylinder, a plunger located outside of the coiling-cylinder, a holding-cylinder located outside of the plunger, mechanisms for rotating the coiling-cylinder, and mechanisms for reciprocating the plunger, substantially as specified.

ANDREW C. CAMPBELL.

Witnesses:
H. R. WILLIAMS,
E. J. HYDE.